W. W. BEEMAN & L. H. GRAVES.
ATTACHMENT FOR PLOWS.
APPLICATION FILED FEB. 14, 1911.
995,944.
Patented June 20, 1911.
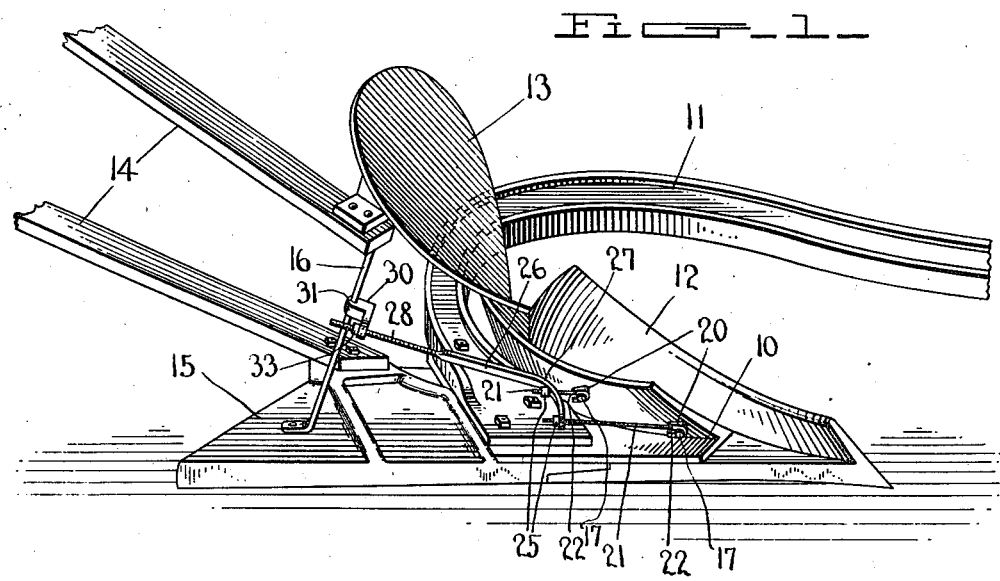
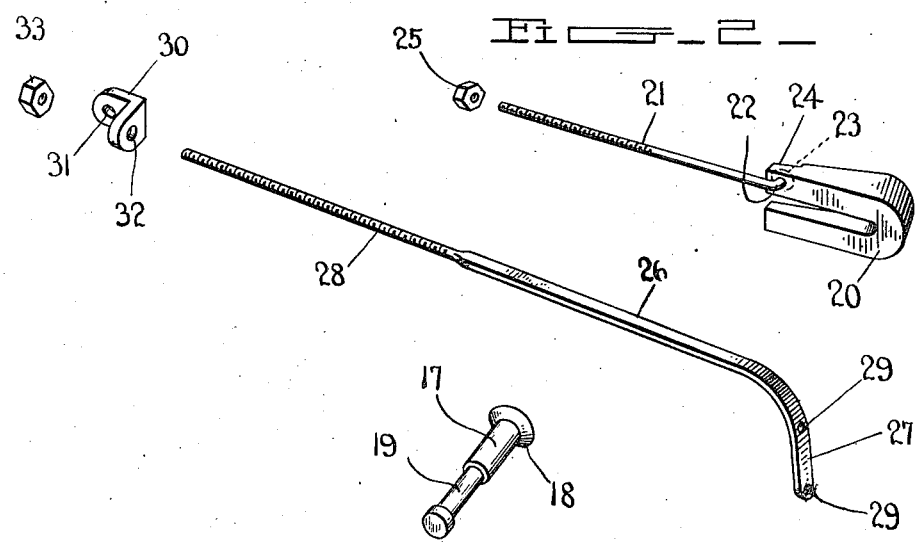
Witnesses
L. B. James
Francis Boyle
Inventors
W. W. Beeman
Lawrence H. Graves
By
Attorneys

UNITED STATES PATENT OFFICE.

WILLIAM W. BEEMAN AND LAWRENCE H. GRAVES, OF OSHKOSH, NEBRASKA.

ATTACHMENT FOR PLOWS.

995,944.  Specification of Letters Patent.   Patented June 20, 1911.

Application filed February 14, 1911.  Serial No. 608,523.

*To all whom it may concern:*

Be it known that we, WILLIAM W. BEEMAN and LAWRENCE H. GRAVES, citizens of the United States, residing at Oshkosh, in the county of Garden, State of Nebraska, have invented certain new and useful Improvements in Attachments for Plows; and we do hereby declare the following to be a full, clear, and exact description of the invention, such as will enable others skilled in the art to which it appertains to make and use the same.

This invention relates to plows more particularly to means for attaching plow shares to the plow standard.

It is well known that in plowing various forms of shares are used to adapt a single plow for working different soils. The nuts on the bolts which fasten the shares to the plow frog often times become rusted and require a great deal of time and labor in removing.

The present invention contemplates obviating entirely the use of the ordinary nuts on the share fastening bolts, and further provides share fastening bolts that are equipped with novel swivel nuts that may be simultaneously unloosened by loosening a single draw bar which is attached to the rear brace of the plow thus minimizing the amount of time and labor expended in changing plow shares.

With the above objects in view the invention resides in the novel swivel nuts and their tightening means which will be hereinafter fully described and claimed.

In the accompanying drawing forming part of this specification, Figure 1 is a perspective view of a plow equipped with our improved share fastening device and lying on the land side to expose the device, Fig. 2 is a perspective detail view of the share securing device with the parts in disassembled position.

Referring now to the drawing in which like characters of reference designate similar parts in the views shown, an ordinary plow is illustrated comprising a frog 10 to which is bolted or otherwise secured a plow beam 11, a share 12 and a mold-board 13. A pair of handles 14 are fixed to the land side 15 of the plow and to the mold-board 13, a cylindrical cross brace 16 spanning the space between the mold-board and land side adjacent to the secured ends of the handles and maintaining the parts in fixed relation.

The above construction constitutes a plow of ordinary form and is not included in the present invention.

The share securing device comprising the subject matter of this invention consists of a plurality of bolts 17, these bolts having flange heads 18 which fit in countersinks in the working face of the plow share and are sufficient in length to project through the plow share and frog. That portion of the bolt which projects beyond the frog is provided with a circumferential groove 19. A U-shaped nut 20 is straddled upon the grooved portion of the bolt and engages the plow frog. There are as many of these bolts and U-shaped nuts as there are bolt holes in the plow share, a single pair of bolts being illustrated in the drawing for the sake of clearness. A pin 21 having an end portion 22 bent at right angles to the body of the pin is provided for each nut, the bent portions of the pins being loosely engaged through suitable openings formed adjacent the terminal of one leg of each nut, the bent portions then being headed up as shown at 23, these heads fitting in countersinks 24 formed in the nuts. Each pin is threaded remote from its head and equipped with a nut 25.

A strap like draw rod 26 is bent laterally at one end as shown at 27, and is provided remote from this bent end with a reduced cylindrical threaded portion 28. The draw rod is of sufficient length to extend from the rear brace bar forwardly nearly to the outermost securing bolt of the plowshare, and is provided with orifices 29 that loosely receive the pins 21, the nuts 25 of the pin bearing against the reverse face of the draw rod and forming means for drawing the pins rearwardly when the draw rod is actuated whereby the nuts are caused to bind against the bolts and plow frog and hold the bolts securely in position.

An angle iron bracket 30 is provided in one leg with an opening 31 which receives the cross brace 16 and is provided in its mating leg with an opening 32 which receives the threaded extremity of the draw rod. A nut 33 threads on the draw rod and bears against the outer face of the draw rod engaging bracket leg. This nut is advanced upon the draw rod thereby moving the latter bodily rearwardly and causing the pins 21 to be pulled rearwardly and tighten the nuts as above described.

In order to remove the plow share it is simply necessary to unloosen the nut 33 from the draw rod when the draw rod may be moved forward so that nuts 20 may be bodily removed from the bolts and the latter withdrawn from the plow share. It is now evident by simply unscrewing one nut a plow share may be removed and another replaced. The nut 33 by being arranged adjacent the rear cross bars 16 is by virtue of its position protected from contact with the ground and unlike the usual fastening nuts of a plow share it may be made of sufficient size to be easily gripped by a wrench and unscrewed should it become rusted. It will thus be observed that a minimum time and amount of labor is required to replace one plow share with another.

What is claimed, is:—

1. The combination with a plow frog, plow share, and cross brace, of a plurality of securing bolts passed through said share and frog, U-shaped nuts straddling said bolts and tapering from their bights to the free ends of their legs and forming wedges, and a tension device carried by said cross brace and operating to wedge said nuts between the frog and bolts.

2. The combination with a plow frog, plow share, and cross brace, of bolts passed through said share and frog, U-shaped nuts of wedge contour straddling said bolts, a draw rod adjustably mounted on said cross brace, and a nut connected with said draw rod and bearing against said brace and adjusting said draw rod whereby to wedge said nuts between said frog and bolts.

3. The combination with a plow standard, plow share and cross brace, of bolts passed through said share and standard, and having peripherally grooved shanks, U-shaped nuts straddling the grooved portions of said bolt shanks, said nuts tapering from their bights to the free ends of their legs and forming wedges, a draw rod adjustably secured to said brace, and loose connections coöperating with said draw rod and said nuts to wedge said nuts between the standard and bolts.

In testimony whereof, we affix our signatures, in presence of two witnesses.

WILLIAM W. BEEMAN.
LAWRENCE H. GRAVES.

Witnesses:
C. M. EMPSON,
W. E. RAEDRUST.